United States Patent
Amir et al.

(10) Patent No.: US 7,539,295 B1
(45) Date of Patent: May 26, 2009

(54) METHOD FOR CREATING AND MAINTAINING THREADS OF PHONE/EMAIL/FAX/SMS CONVERSATIONS

(75) Inventors: Arnon Amir, Saratoga, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/195,904

(22) Filed: Aug. 21, 2008

(51) Int. Cl.
H04M 3/00 (2006.01)
(52) U.S. Cl. ............ 379/265.01; 379/9.03; 379/265.07; 379/265.09; 379/266.1
(58) Field of Classification Search ................ 379/9.03, 379/265.01–266.1
See application file for complete search history.

(56) References Cited

U.S. PATENT DOCUMENTS 6,640,239 B1  10/2003  Gidwani
7,085,366 B2  8/2006  O'Neil
7,127,058 B2  10/2006  O'Connor et al.
7,328,242 B1  2/2008  McCarthy et al.

*Primary Examiner*—MD S Elahee
(74) *Attorney, Agent, or Firm*—Oppenheimer Wolff & Donnelly LLP

(57) ABSTRACT

A method for creating and maintaining threads of communications comprises accepting an electronic-communication call from a caller, determining if the caller is a new or previous caller by determining if a prior-caller user identification is contained within a call-receiving system, responsive to determining that the caller is a new caller assigning a new-caller user identification to the new caller and assigning a unique thread identification for communications related to a new issue, and responsive to determining that the caller is a known previous caller verifying a known-caller user identification and determining whether the known previous caller is calling about a new issue. Responsive to determining that the known previous caller is calling about a new issue, the method further includes assigning a unique thread identification to the new issue. Responsive to determining that the known previous caller is calling about an existing issue, the method further includes obtaining a list of previous thread identifications.

1 Claim, 5 Drawing Sheets

METHOD FOR CREATING AND MAINTAINING THREADS OF PHONE/EMAIL/FAX/SMS CONVERSATIONS

FIELD OF THE INVENTION

The present invention generally relates to the field of electronic communications. In particular, the present invention is directed to a method for creating and maintaining threads of electronic communications, such as by phone, email, fax, or short message service ("SMS").

BACKGROUND OF THE INVENTION

With increasing numbers of voice services and voice messaging systems, a session of interaction about a single topic (e.g., scheduling a contractor's service, following up on a financial transaction, customer service inquiry, etc.) may span over multiple phone calls, voice messages, fax transmissions, instant messages, emails and the like, through different phone numbers and/or email addresses (e.g., office phone, home phone, mobile phone, business email, private email, fax, instant messaging, etc.) over an extended period of time. However, unlike email replies, which may efficiently maintain and present threads of correspondences, phone replies lack that capability.

Hence, it becomes burdensome to follow up on a thread, which may comprise multiple live conversations, emails, faxes, and instant messages, in order to figure out the order in which they were placed and the current state of the conversation. One example includes multiple phone calls made to customer service regarding a specific product/service/issue, which may include phone calls related to placing an order, following up on payment, and checking the status of shipping and delivery of the order. Modem call-receiving systems may maintain audio records of all calls, linked to a customer's record and/or to a service ticket. Often times these call-receiving systems require the customer to remember and reference a customer number, a case number or a ticket/docket number in order to retrieve the thread information. This method puts a burden on the customer to provide such a number (when prompted) in order for the call-center operator to be able to access the customer's record and/or service ticket, if such records are maintained by the call-receiving system.

Furthermore, today's technology often requires the customer to authenticate to the system (e.g., by entering an account number as well as a zip code or the last four digits of a social security number), each time he or she engages in a phone conversation, before the thread may be safely retrieved and any progress may be made.

Hence, there is a need for a method to automatically label, maintain, synchronize, summarize, display, and trace back threads consisting of phone calls, email, faxes, instant messages, and the like, and to carry authentication information throughout the communication thread.

BRIEF SUMMARY OF THE INVENTION

The present invention solves the foregoing problems by providing a method for creating and maintaining threads of electronic communications comprising accepting an electronic-communication from a caller, the electronic communication call handled by a call-receiving system, and determining if the user is a new user or a known previous user by determining if a prior caller identification is contained within the call-receiving system. Responsive to determining that the caller is a new caller, the method may include obtaining caller information and assigning a new-caller user identification to the new caller, obtaining details regarding a new issue for contact, assigning a unique thread identification for all communications related to the new issue, and linking the new-caller user identification with the thread identification for presentation in subsequent calls. Responsive to determining that the caller is a known previous caller to the call-receiving system, the method may include obtaining and verifying a known-caller user identification and determining whether the known previous caller is calling about a new issue. Responsive to determining that the known previous caller is calling about a new issue, the method may include assigning a unique thread identification for all communications related to the new issue, and linking the known-caller user identification with the thread identification for presentation in subsequent calls. Responsive to determining that the known previous caller is calling about an existing issue, the method may include obtaining a list of previous thread identifications for the known previous caller based upon the known-caller user identification, and determining whether there is more than one previous thread identification for the known previous caller. Then, responsive to determining that there is more than one previous thread identification for the known previous caller, the method may include presenting the known previous caller with a list of all previous thread identifications along with details of each thread identification, allowing the known previous caller to select a desired thread identification from the list of previous thread identifications, assigning the existing issue to the selected thread identification, and linking the known-caller user identification with the selected thread identification for presentation in subsequent calls. Finally, responsive to determining that there is only a single previous thread identification for the known previous caller, the method may include assigning the existing issue to the single previous thread identification, and linking the known-caller user identification with the single previous thread identification for presentation in subsequent calls.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION OF THE INVENTION

The present invention includes a method for creating and maintaining threads of electronic communications, such as by phone, email, fax, or SMS. In particular, the method of the present invention may provide for automatically labeling, maintaining, synchronizing, summarizing, displaying, and tracing back, electronic communication threads consisting of phone calls, emails, faxes, instant messages, etc., and carrying authentication information throughout the communication thread.

One aspect of the method for creating and maintaining threads of electronic communications, in accordance with the present invention, includes associating an identification (ID) with a communication thread, and further to carry the associated ID with transmitted materials of the communication thread.

Another aspect of the method for creating and maintaining threads of electronic communications, in accordance with the present invention, is to store the communication thread on one or more devices.

Yet another aspect of the method for creating and maintaining threads of electronic communications, in accordance with the present invention, is to provide an extended caller ID to the communication thread.

Still another aspect of the method for creating and maintaining threads of electronic communications, in accordance with the present invention, is to provide an auxiliary communication channel to carry a thread ID.

Another aspect of the method for creating and maintaining threads of electronic communications, in accordance with the present invention, is to create alternative thread IDs.

Yet another aspect of the method for creating and maintaining threads of electronic communications, in accordance with the present invention, is to create user interfaces and thread synchronization.

Still another aspect of the method for creating and maintaining threads of electronic communications, in accordance with the present invention, is to provide a user with the ability to leave a unique call-back extension number, where the called party may send a response. The unique extension number may be associated with, and uniquely identify, a thread of communication.

Figure 1A:
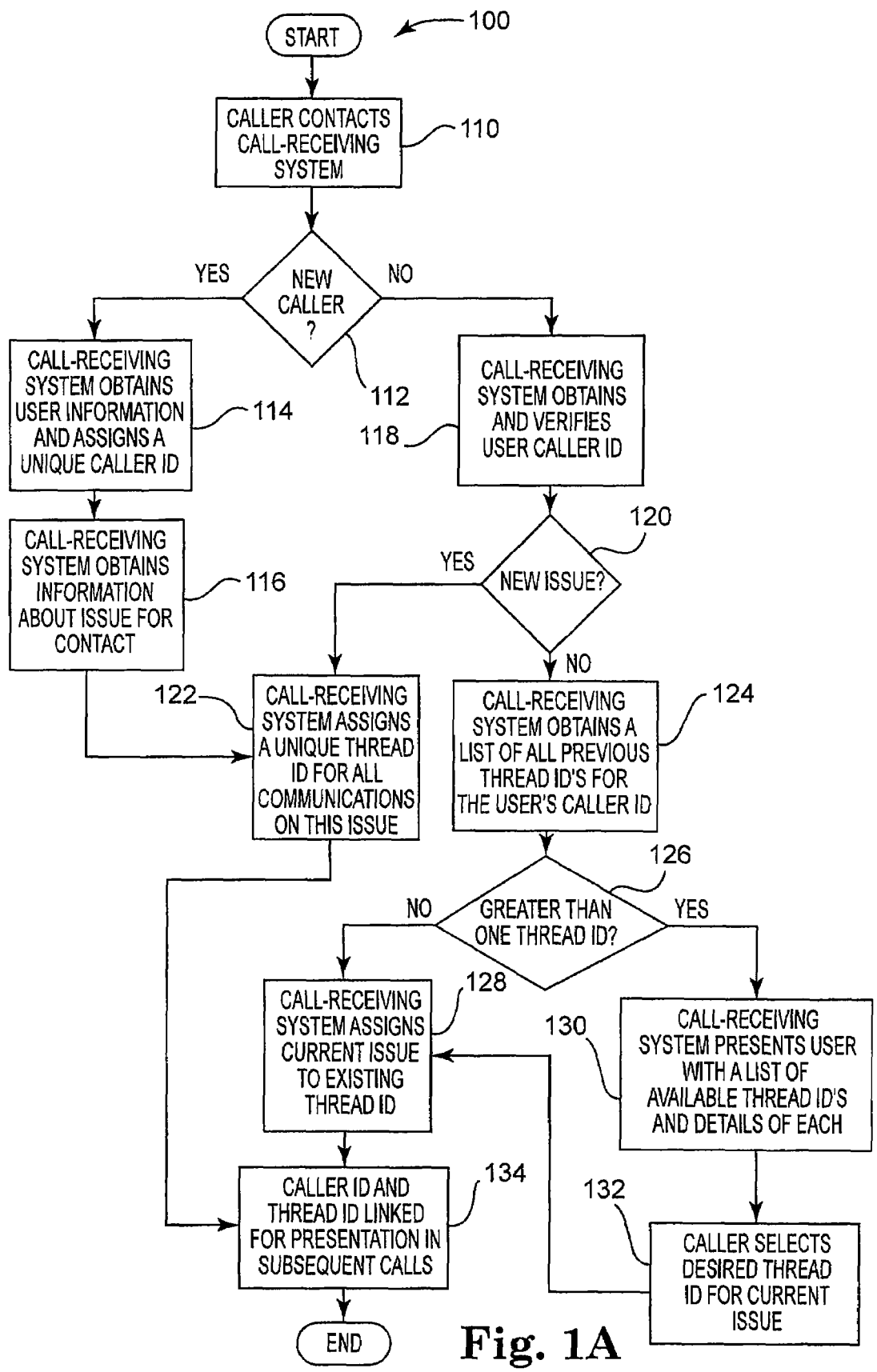
FIG. 1A illustrates a flow diagram of one exemplary method of re-establishing a caller user ID and thread ID when a caller contacts another person or a call-receiving system.

FIG. 1A is a diagram illustrating one exemplary method 100 of establishing or re-establishing a caller user ID and thread ID when a caller contacts a call-receiving system. Method 100 may include, but is not limited to, the steps described below. Thus, workers skilled in the art will appreciate that the order, number, and contents of the steps described below may be modified without departing from the intended scope of the present invention.

Method 100 begins at step 110, which is an initialization step, with a caller contacting a call-receiving system. Contact may be made by way of electronic communication means such as, for example, phone, email, fax, or SMS. However, for purposes of this example, method 100 will be explained as if the user contact were made by phone. Likewise, the call-receiving system may in some cases be the person being called. However, for purposes of example, the method is explained herein as if the called party is such a system.

Next, at step 112, the call-receiving system determines if the caller is a new caller or a known previous caller by way of data transmitted with the call. If the caller is a new caller (i.e., no prior-caller user-ID records exist within the call-receiving system), then the method proceeds to step 114. However, if the caller is a known previous caller (i.e., a prior-caller user-ID record exists within the call-receiving system, then the method proceeds to step 118.

The method continues at step 114 wherein the call-receiving system obtains user information (e.g., first and last name, business name, etc.) and assigns a unique user ID to the caller. This unique user ID may be carried with the user for subsequent calls to the call-receiving system, which may be recognized in step 112 as previously explained. The unique user ID may be added to the end of the dialed call-receiving system number and used by the call-receiving system to automatically identify the caller upon subsequent calls. One example would be "1-800-555-1234-9876", where "1-800-555-1234" is the call-receiving system telephone number, and "9876" is the unique user ID assigned to the caller.

At step 116, the call-receiving system may obtain information regarding the reasons for contact by the caller. This may be, for example, an initial customer order, a price or product inquiry, a service inquiry, etc. However, as will be appreciated by those skilled in the art, numerous other types of information may also be obtained in this step. Once the necessary information about the reasons for contact by the caller is obtained by the call-receiving system, the method may proceed to step 122.

Turning now to step 118, the call-receiving system may obtain and verify the user ID of the known previous caller. This may be accomplished, for example, by using the unique user ID assigned in step 114 above to query a records database in a Thread Host Device (THD) which may be sorted by user ID and may also contain fields for ancillary user information such as first and last name, business name, etc. This information may then be presented to the call-receiving system operator, if so desired.

Next, at step 120, the call-receiving system may query the user to determine if the caller is calling for a new issue, or alternatively for an existing issue for which the caller has previously contacted the call-receiving system. This may be accomplished by way of querying of a records database in a THD, which may be sorted by user ID and may contain fields for thread IDs which are assigned to individual caller issues which may have been previously established. If this is a new issue (i.e., no thread IDs exist for the user), the method may proceed to step 122. If, however, this is not a new issue (i.e., at least one thread ID exists for the caller), the call-receiving system may query the caller to determine if the caller is calling about an existing thread ID or if the caller is calling for a new reason. If the caller is calling for a new reason, the method may proceed to step 122. If the caller is calling about an existing thread ID, the method may instead proceed to step 124. This step may be automatically bypassed on subsequent calls if the caller further includes a desired thread ID at the end of the dialed call-receiving system number. For instance, an example may be entering "1-800-555-1234-9876-0001", where "1-800-555-1234" is the call-receiving system telephone number, "9876" is the unique user ID assigned to the caller, and "0001" is the thread ID in which the caller wishes to communicate. This information may be used by the call-receiving system operator, for example, to properly route the call to an operator who had previously communicated with the caller in regards to this issue.

At step 122, the call-receiving system may obtain information about the reasons for contact by the caller (if this hasn't already been accomplished by step 116) and assign a unique thread ID for all communications on this issue by the caller. As previously mentioned, the call-receiving system may store this data to a database in a Thread Host Device (THD) for use in subsequent calls as outlined previously herein. Further, the caller may also use this data to store, transfer, update, split, etc. duplicate records which may exist, for instance, on the caller's communication devices. Upon completion of step 122, the method may proceed to step 134.

At step 124, the call-receiving system may obtain a list of all previous thread IDs associated with the caller's user ID. As previously mentioned, this may be accomplished by querying records of a database in a THD which is sorted by user ID and may contain fields for thread IDs which are assigned to individual caller issues which may have been previously established. Upon completion of step 124, the method may proceed to step 126. Alternatively, the user ID and desired thread ID may be provided by the caller in the dialed callback number as previously described in step 120 above, which would allow the method to proceed to step 128.

At step 126, the call-receiving system determines if more than one thread ID exists for the caller's user ID. If only one thread ID exists, the call-receiving system may determine that the caller must be calling for this thread ID, and the method may proceed to step 128. If, however, more than one thread ID exists, the method proceeds to step 130.

At step 128, the call-receiving system assigns the existing thread ID to the current call. As previously mentioned, this data may be stored to a database in a THD for use in subsequent calls as outlined previously herein. Further, the caller may also use this data to, for example, store, transfer, update, and/or split, duplicate records which may exist, for instance, on the caller's communication devices. Upon completion of step 128, the method may proceed to step 134.

At step 130, the call-receiving system may present the caller with a list of existing thread IDs and the necessary details of each, as well as prompt the caller to select which thread ID to associate the present call with. Upon completion of step 130, the method may proceed to step 132.

At step 132, the caller may select the desired thread ID from the list presented in step 130 in order to accurately associate the subject matter of the present call. Upon completion of step 132, the method may proceed to step 128 where the call-receiving system may assign the existing thread ID to the current call, as previously explained herein.

Finally, at step 134, the user ID and thread ID may be linked and stored together for presentation to the caller and/or call-receiving system attendant upon subsequent calls to the call-receiving system. The user ID and thread ID may be linked and stored together, for example, in a database record in a THD. Upon completion of step 134, the exemplary method 100 may be complete.

Extended User ID

The maintenance of threads may be based on IDs. The initial caller may establish a unique user ID on each call as explained previously herein with respect to FIG. 1A, which may comprise the user ID and the thread ID. If the caller wishes to add additional callers to a communication thread, the call-receiving system may be able to extract the desired thread ID from the original caller's user ID and embed it as part of an additional caller's own extended user ID. This may be desirable in a situation where multiple parties require access to a single set of information, for example if a husband and wife shared a joint bank account.

Likewise, using the above example of a husband and wife sharing a joint bank account, the husband may have a unique user ID (e.g., 9876), as would the wife (e.g., 9875). Any calls made to the call-receiving system by either the husband or the wife and which were directed to the same issue (e.g., account balance for the joint bank account) would share the same thread ID (e.g., 0001). Therefore, if the husband called the call-receiving system using his user ID along with the thread ID (i.e., 9876-0001) or the wife called the call-receiving system using her user ID along with the thread ID (i.e., 9875-0001), the call-receiving system would have no need to walk either through authentication questions which are common to known call-receiving systems. Further, the unique number (e.g., 9876-0001 or 9875-0001) may automatically retrieve the case thread on the call-receiving system operator's computer screen. Preferably, it may route the call to the same call-receiving-system operator who answered prior calls, if such operator is available. By simplifying all the aforementioned steps, the husband and wife may receive much more efficient service, substantially improving their experience with the call-receiving system.

As may be appreciated, this approach to creating IDs is more secure than the widely used "personal quiz" method. For instance, instead of using a lifetime, never-expired password (e.g., the last four digits of a person's social security number), a caller's thread-related password is only valid for the current thread. Thus, if the caller's thread-related password is compromised, an imposter could only use the ID for accessing a single thread until that thread is closed.

Further, since an extension number may be sent with a call as part of the user ID, the caller may be able to automatically call back from any phone device which supports user ID.

When the call is recorded and sent to the host thread server, the extended user-ID may be kept with the call and used to associate the call with previous calls of this thread. Emails generated with relation to any of these calls may carry this identification within the email subject, body, or the header meta-data.

Figure 1B:
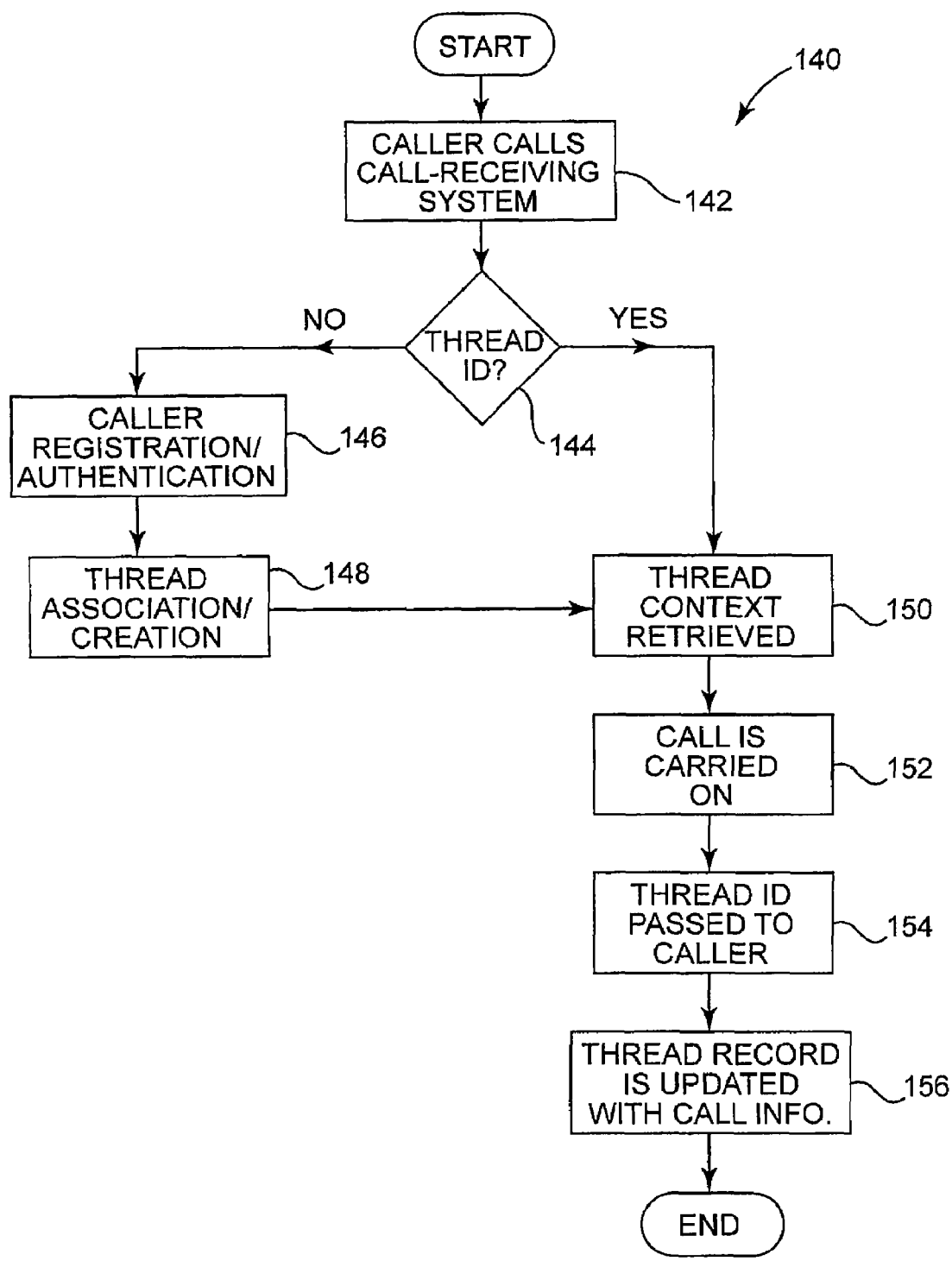
FIG. 1B illustrates another exemplary embodiment of a functional block diagram of a method for creating and maintaining threads of electronic communications, such as by phone, email, fax, or SMS.

FIG. 1B illustrates another exemplary embodiment of a functional block diagram of a method 140 for creating and maintaining threads of electronic communications, such as by phone, email, fax, or SMS. Method 140 may include, but is not limited to, the steps described below.

As illustrated in FIG. 1B, method 140 begins with the caller contacting the call-receiving system in step 142. Then, in step 144, the call-receiving system determines if a thread ID has been provided. A thread ID may be provided as, for example, a suffix to the dialed phone number, a unique phone number associated with the thread, using the main channel of communication to transfer a brief message indicating the thread ID, or via a secondary channel of communication. If no thread ID is provided, then the call-receiving system routes the call to a caller registration/authentication process in step 146, followed by a thread selection or creation of a new thread and thread ID in step 148. Alternatively, if a thread ID has been provided, caller identification and authentication may be avoided, which may reduce overhead and make the process more efficient. Thus, once the thread ID has been identified, the thread context may be retrieved by the call-receiving system in step 150. The method continues at step 152 where the call is carried on and the caller and call-receiving system make use of the thread context. During the call, or after the call has ended, the call-receiving system may send the thread ID to the caller, for subsequent references, as illustrated in step 154. This is particularly important at the first call of a new thread, and might be avoided in subsequent calls which already make use of this information. Finally, in step 156, the thread record associated with the thread ID is updated with the call information, and the process ends.

Figure 1C:
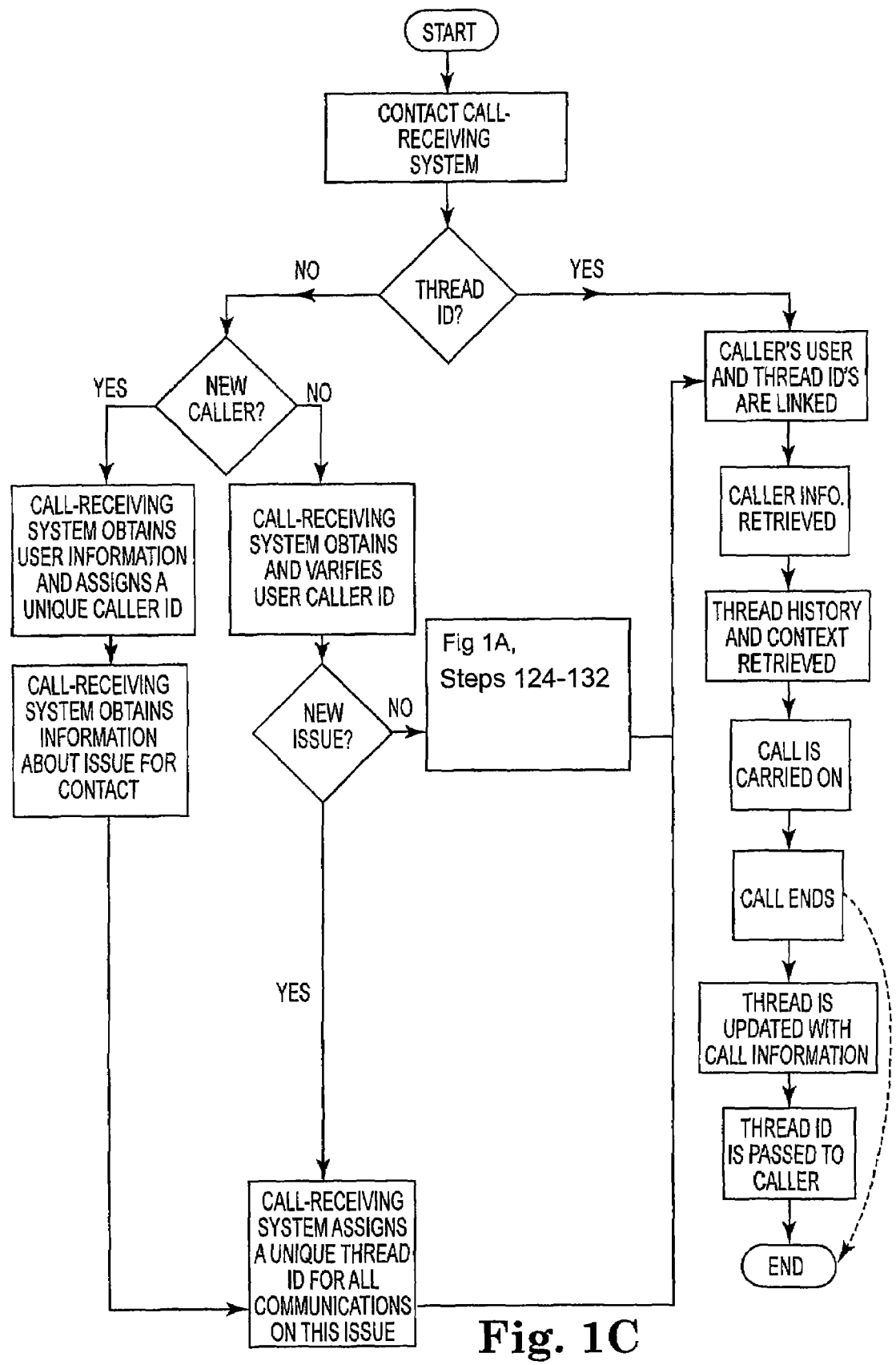
FIG. 1C illustrates yet another exemplary embodiment of a functional block diagram of a method for creating and maintaining threads of electronic communications in accordance with the present invention, which extends and provides additional details to the methods described in FIGS. 1A and 1B.

FIG. 1C illustrates yet another exemplary embodiment of a functional block diagram of a method 160 for creating and maintaining threads of electronic communications in accordance with the present invention, which extends and provides additional details to FIGS. 1A and 1B. In particular, method 160 of FIG. 1C combines the new user registration and issue (thread) initiation illustrated in FIG. 1A with the thread ID handling illustrated in FIG. 1B. At the end of the call, the thread record may be updated on the THD, as well as in the call-receiving system.

Figure 2:
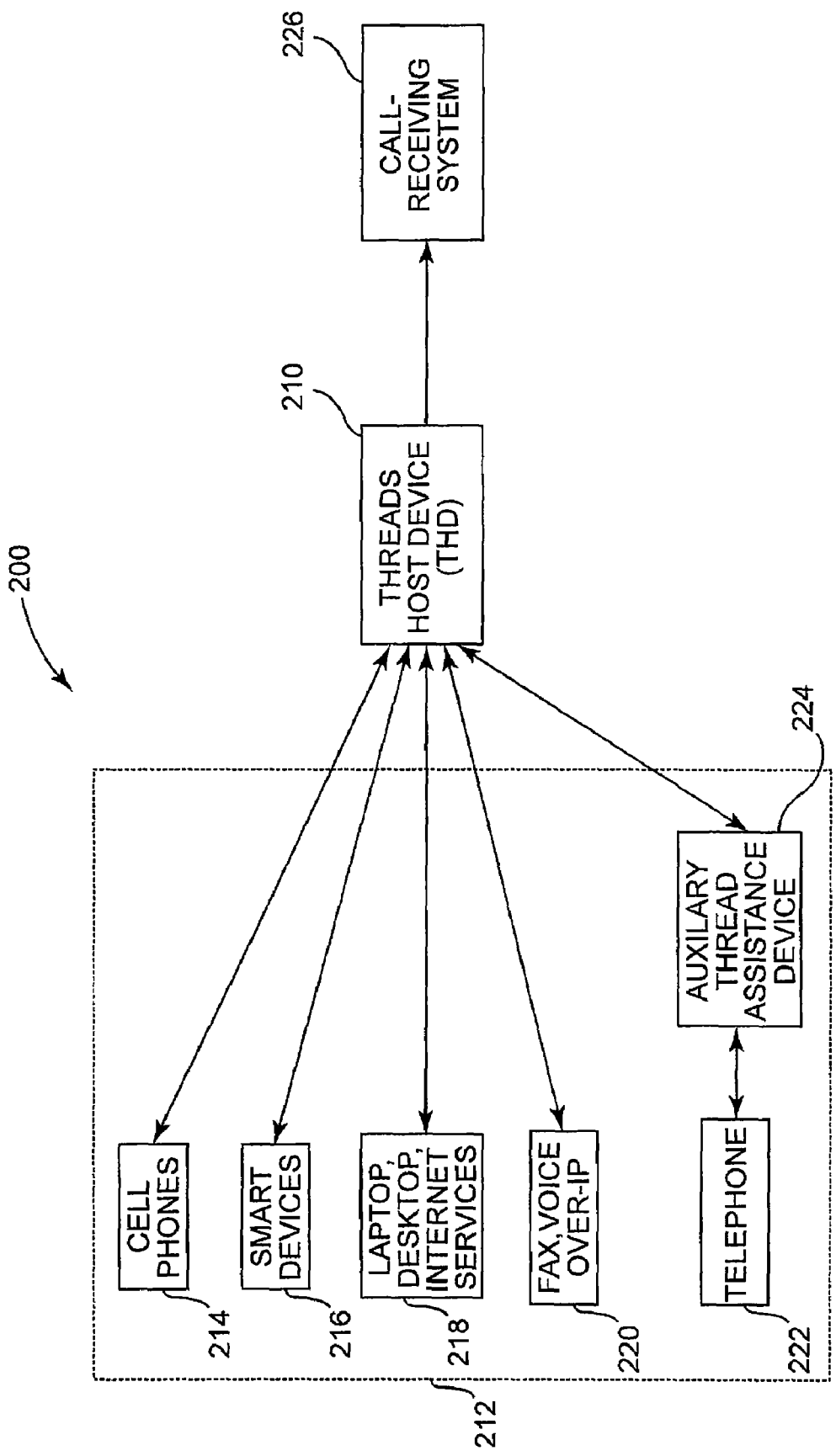
FIG. 2 illustrates a functional block diagram of one exemplary system for creating and maintaining threads of electronic communications, such as by phone, email, fax, or SMS.

FIG. 2 illustrates one exemplary embodiment of a functional block diagram of system 200 for creating and maintaining threads of electronic communications, such as by phone, email, fax, or SMS. System 200 may include, but is not limited to, a Thread Host Device (THD) 210, participating caller devices 212, an auxiliary thread assistance device 224, and a call-receiving system 226.

THD 210 may comprise, for example, a home computer connected to the Internet, an Internet server owned by a service provider, or a hand-held device or cell phone connected to the Internet. Furthermore, THD 210 may be operable for storing and maintaining records of communication by way of electronic database files which may contain at least a user ID and thread ID associated with the user ID. THD 210 typically resides on a device associated with the caller, and is not typically part of the receiving system. Thus, as will be appreciated by those skilled in the art, the present invention contemplates thread tracking on the caller's own device. It should be noted that the information stored on THD 210 may be replicated in part or in whole to other devices, such as a caller's cell phone 214 or smart device 216, for purposes of general availability, redundancy, retrieval, display, and the like.

As illustrated in FIG. 2, system 200 may include any number of participating caller devices 212, which may comprise cell phones 214, smart devices 216, laptop/desktop/Internet services 218, fax/Voice-Over-IP (VOIP) 220, or telephones 222. As further illustrated in FIG. 2, telephones 222 may be connected to an auxiliary thread-assistance device 224, which may be capable of capturing and transmitting information from the participating caller devices 212 to the associated THD 210 and displaying/activating thread-related operations. One such example of an auxiliary thread assistance device 224 may be a monitoring device for analog phones, which may be configured to record from an analog phone line, convert the analog form to digital form, and send the digital recording to a computer over the Internet. The auxiliary thread-assistance device 224 may further include a small display to show thread-related information. According to the method of the present invention, communications may be saved and stored in the host device, organized in threads. Thus, a telephone device may store calls and be connected through a modem to the host device in order to maintain threads.

As further illustrated in FIG. 2, system 200 may include a call-receiving system 226 operably connected to THD 210. Thus, in such a configuration, call-receiving system 226 may also be operably connected to any number of caller devices 212 when a caller makes a call to call-receiving system 226. It is contemplated that in certain embodiments THD 210 may be a cell phone, and forwarding of information may be carried in a peer-to-peer fashion between the personal devices.

Auxiliary Communication Channel

In one alternative embodiment, a second communication channel may be utilized to carry the thread ID. For example, when a voice message is left in a voice mailbox, the receiving party may expect optional thread ID information to arrive from the caller via SMS, wherein the SMS may contain such identification information as the user ID, the beginning and ending time of the voice message, and a voice signature that is computed with respect to the voice content of the actual message. As a result, the receiving party may uniquely and robustly associate the thread information with the corresponding voice message and keep both of them together. When the receiving party returns the call, the thread ID information may then be passed along at the beginning of the call to the other party, allowing association of the current call with the previous call(s). If no thread information is received, the phone may automatically generate new thread information for this voice message.

While a thread ID may be best utilized if passed at the time of initiating a call, thread information may be passed before, during, and/or after the call takes place. As those skilled in the art will appreciate, thread information is not limited to the thread ID alone. Thread information may contain other call identifiers and properties, including but not limited to, call start and end times, location at the time the call was received, device ID, a voice signature, and the like.

Alternative Thread IDs

The method of sharing threads IDs may be utilized with other methods of ID distribution. For example, a caller may attach some audible or textual token to the contents of the transmission. The code in this token may be found by the THD using speech recognition (if it is a voice message) or text search for particular patterns. Thus, the caller may leave a unique mix of digits and words, which must be repeated by the responding party.

Figure 3:
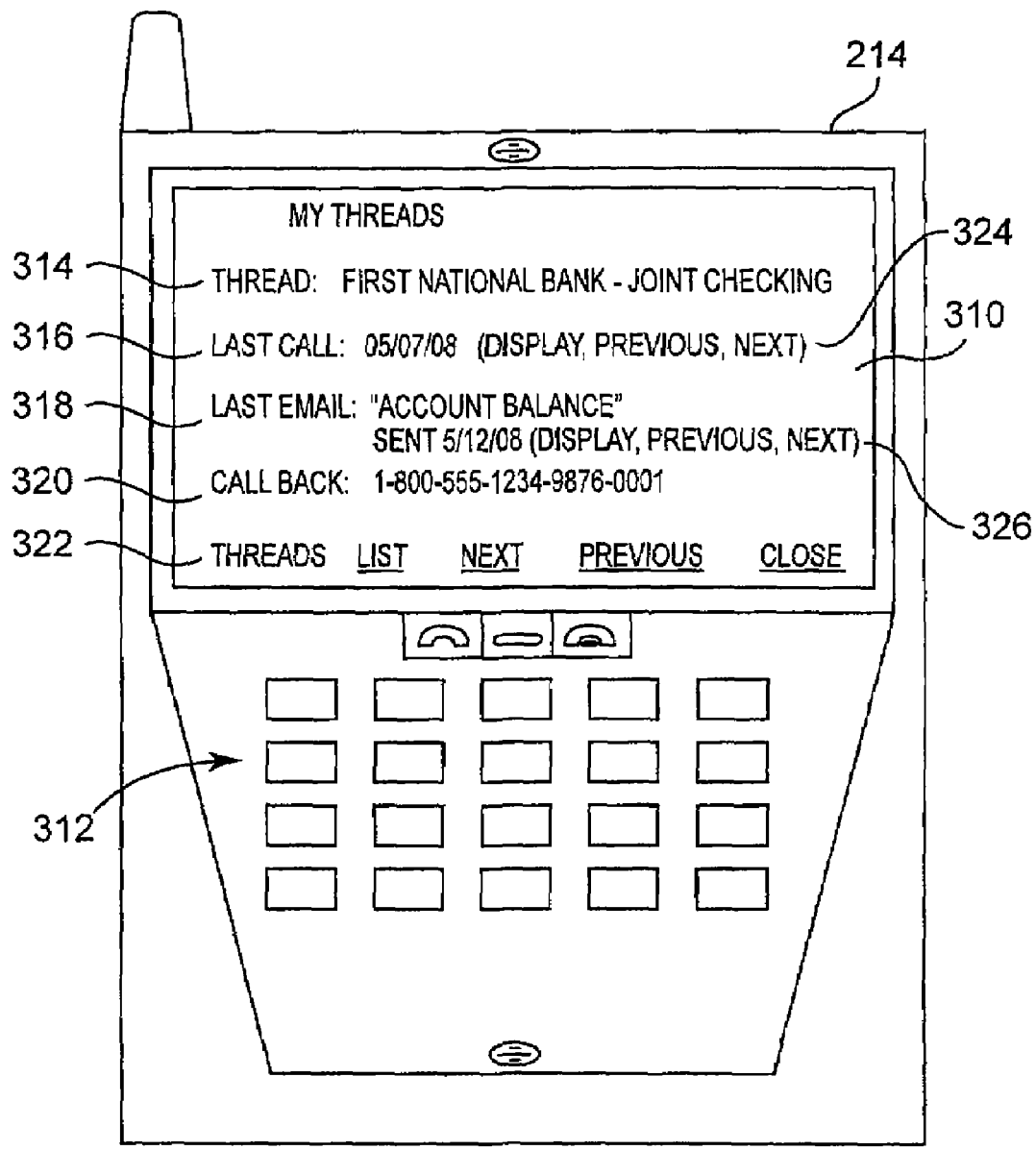
FIG. 3 illustrates one exemplary embodiment of a user's device for creating and maintaining threads of electronic communications comprising an exemplary screen shot displaying data related to a communication thread of a user.

FIG. 3 illustrates one exemplary embodiment of a caller device for creating and maintaining threads of electronic communications. In particular, the device illustrated in FIG. 3 comprises an exemplary screen shot 310 displaying data related to a communication thread of a caller.

As shown in FIG. 3, the exemplary caller device is a cell phone 214 including a screen 310 and a keypad 312. Although the caller device is illustrated as a cell phone, those skilled in the art will appreciate that numerous other alternative devices are contemplated and within the intended scope of the present invention. As illustrated in FIG. 2, screen 310 may include, for example, a thread comment line 314, a last call line 316, a last email line 318, a call back line 320, and an action line 322. However, screen 310 may include additional "lines" displaying various other types of information.

In particular, thread comment line 314 may include a summary, as written by the caller, of the pertinent information needed to relay to the caller the context of the thread. In the embodiment illustrated in FIG. 3, thread comment line 314 reads "First National Bank—Joint Checking".

As further illustrated in FIG. 3, last call line 316 may display the date of the last call regarding the particular thread. For example, in the present embodiment, last call line 316 reads "05/07/08". Last call line 316 may further include an action line 324 which may enable the caller to toggle between calls related to a particular thread, and optionally to play back recordings of the calls that are stored in memory.

Last email line 318 may be configured to display the date of the last email regarding the particular thread. In the present embodiment, last email line 318 reads "Account balance" with a sent date of "05/12/08". Last email line 318 may further include an action line 326 which may enable the caller to toggle between emails related to a particular thread, and optionally to read/respond to these emails.

Call-back line 320 may be configured to display the extended call-back number, including the caller's user ID and thread ID for the particular thread. For example, in the present embodiment illustrated in FIG. 3, call back line 320 reads "1-800-555-1234-9876-0001" where the first eleven digits (i.e., 1-800-555-1234) comprise the phone number for First National Bank, the next four digits comprise the caller's user ID (i.e., 9876) and the final four digits comprise the caller's thread ID (i.e., 0001). By calling back the number displayed in call back line 320, the caller may bypass the authentication process, and be directly connected to a call-receiving system operator who can determine the reason for the call, as well as the past history of calls for the particular thread of communication.

Finally, as illustrated in FIG. 3, action line 322 may be configured to list all available threads, to toggle between threads, and to close threads as desired by the caller.

As may be appreciated by those skilled in the art, the caller may forward the thread information to other phones (e.g., to the caller's office phone) for thread synchronization. Forwarding may be invoked either manually, automatically, based on events (e.g., receiving a new call on the thread, when such information is requested by the office phone), or periodically. A thread may be either terminated by the caller, left open for future continuation, or terminated automatically (e.g. if there is no more correspondence for some period of time). The caller may decide to split a thread into at least two threads, by assigning at least one of its calls to start one or more new threads.

Furthermore, it is contemplated that a thread ID/meta-data may include personal authentication information. A thread ID/meta-data may include ticket/case/docket information. This information may be presented on the display before, during, and/or after the call, and may be passed to a third device, e.g., a computer, to fetch related-case information records. Phones may voice-record incoming and outgoing calls and maintain the calls logged and tagged by threads. In particular, the use of extension-based ID may be easily utilized for this purpose. Thread communication may be restricted and limited to only a set of participating devices. In such a case, only those devices may be used to connect to this thread.

For example, the set of devices may include only one personal cell phone, or one cell phone and one PDA. A thread may include communications between two, three or more parties. In a multi-party thread, there may be sub-threads of communication between subgroups of the parties. A thread may be associated with various objects and entities such as, for example, customer records, documents, agent ID, account number etc. Furthermore, some of these objects and entities may be shared between the parties in the thread. Similarly, others may be kept by only one side of the communication, such as call-center-confidential information or the customer's personal records and documents. In addition, closed threads may be archived for future reference.

Although the present invention has been described with reference to preferred embodiments, workers skilled in the art will recognize that changes may be made in form and detail without departing from the spirit and scope of the invention.

What is claimed is:

1. A method for creating and maintaining threads of electronic communications comprising:
   accepting an electronic-communication call from a caller, the electronic communication call handled by a call-receiving system;
   determining if the caller is a new caller or a previous caller by determining if a prior-caller user identification is contained within the call-receiving system;
   responsive to determining that the caller is a new caller,
   obtaining caller information and assigning a new-caller user identification to the new caller;
   obtaining details regarding a new issue for contact;
   assigning a unique thread identification for all communications related to the new issue; and
   linking the new-caller user identification with the thread identification for presentation in subsequent calls;
   responsive to determining that the caller is a known previous caller to the call-receiving system, obtaining and verifying a known-caller user identification and determining whether the known previous caller is calling about a new issue;
   responsive to determining that the known previous caller is calling about a new issue,
   assigning a unique thread identification for all communications related to the new issue; and
   linking the known-caller user identification with the thread identification for presentation in subsequent calls;
   responsive to determining that the known previous caller is calling about an existing issue,
   determining whether a caller-provided thread identification was entered by the known previous caller;
   responsive to determining that a caller-provided thread identification was entered by the known previous caller, automatically incorporating the caller-provided thread identification into further communications related to the call, the caller-provided thread identification facilitating authentication of the call;
   responsive to determining that a caller-provided thread identification was not entered by the known previous caller,
   obtaining a list of previous thread identifications for the known previous caller based upon the known-caller user identification, wherein each thread identification may represent multiple communications via various electronic devices; and
   determining whether there is more than one previous thread identification for the known previous caller;
   responsive to determining that there is more than one previous thread identification for the known previous caller,
   presenting the known previous caller with a list of all previous thread identifications along with details of each thread identification;
   allowing the known previous caller to select a desired thread identification from the list of previous thread identifications;
   assigning the existing issue to the selected thread identification; and
   linking the known-caller user identification with the selected thread identification for presentation in subsequent calls;
   responsive to determining that there is only a single previous thread identification for the known previous caller,
   assigning the existing issue to the single previous thread identification; and
   linking the known-caller user identification with the single previous thread identification for presentation in subsequent calls.

* * * * *